United States Patent [19]

Rumbaugh

[11] Patent Number: 5,101,453

[45] Date of Patent: Mar. 31, 1992

[54] FIBER OPTIC WAFER PROBE

[75] Inventor: Scott H. Rumbaugh, Lake Oswego, Oreg.

[73] Assignee: Cascade Microtech, Inc., Beaverton, Oreg.

[21] Appl. No.: 725,978

[22] Filed: Jul. 5, 1991

[51] Int. Cl.[5] .............................. G02B 6/04
[52] U.S. Cl. ........................ 385/12; 385/83
[58] Field of Search ............... 385/12, 13, 83, 84; 250/227.14, 227.16

[56] References Cited

U.S. PATENT DOCUMENTS

| | | | |
|---|---|---|---|
| 4,652,082 | 3/1987 | Warner | 350/96.20 |
| 4,818,059 | 4/1989 | Kakii et al. | 350/96.21 |
| 4,970,386 | 11/1990 | Buck | 250/227.24 |
| 4,972,073 | 11/1990 | Lessing | 250/227.16 |

OTHER PUBLICATIONS

Modolo et al., "Wafer Level High-Frequency Measurements of Photodetector Characteristics," *Applied Optics*, vol. 27, pp. 3059-3061 (1988).

Primary Examiner—Frank Gonzalez
Attorney, Agent, or Firm—Chernoff, Vilhauer, McClung & Stenzel

[57] ABSTRACT

A fiber optic wafer probe, for use in measuring the parameters of photodetectors and other optoelectronic test devices at the wafer level, has a probe body along which an optical fiber extends to protrude from a tip of the probe body. The probe body loosely guides the optical fiber so that at least a significant portion of the length of the optical fiber is movable longitudinally with respect to the tip and probe body. This provides protection against excessive contact force between the fiber and the test device by enabling the optical fiber to buckle longitudinally in response to longitudinal overtravel of the fiber toward the test device. The probe body is of elongate shape with a probe tip at one end and a connector at the other end for detachably connecting the optical fiber to the probe body. The probe body length between the tip and connector is preferably substantially at least four inches to minimize undesirable multimode light transmission effects in a manner consistent with providing a replaceable fiber. The fiber is loosely guided through a bend along the probe body, which aids in minimizing the multimode effects.

17 Claims, 2 Drawing Sheets

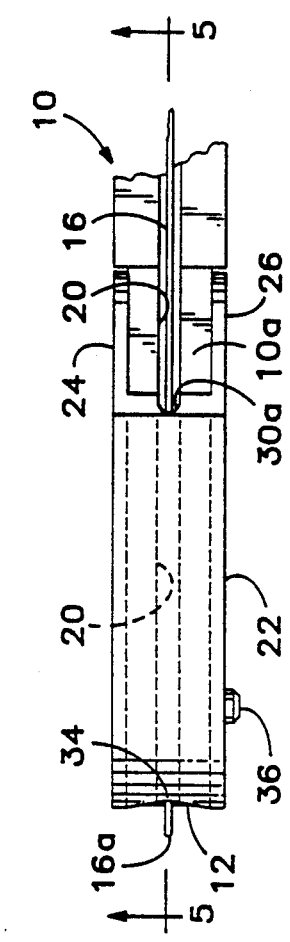
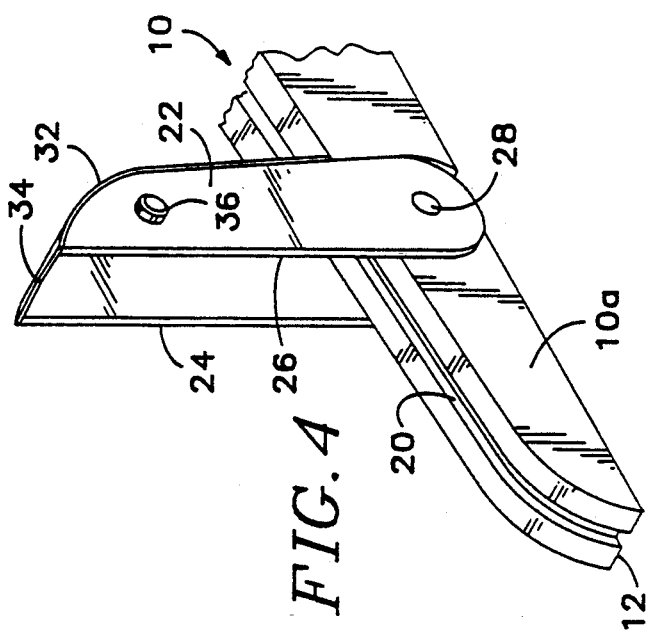
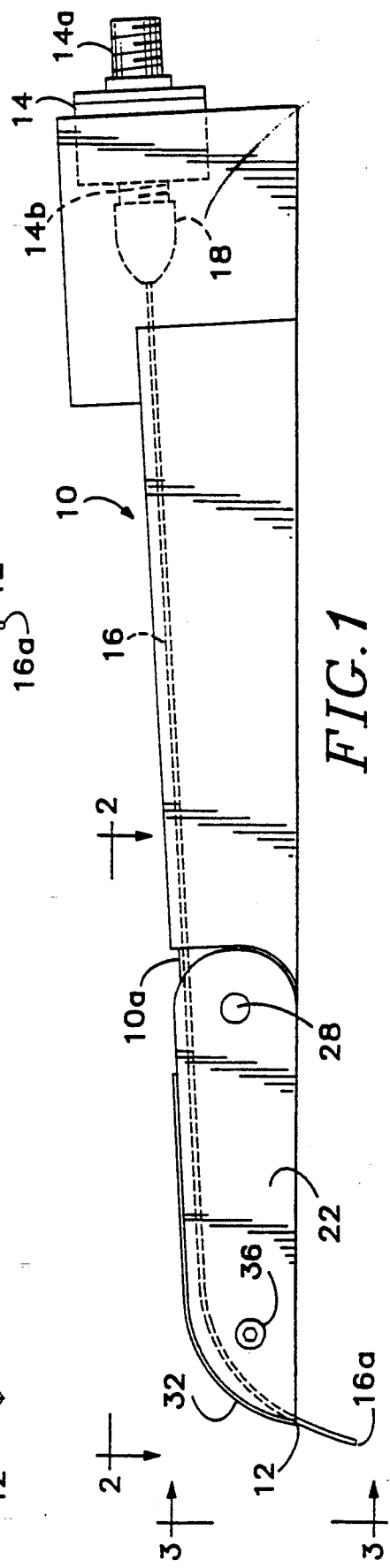

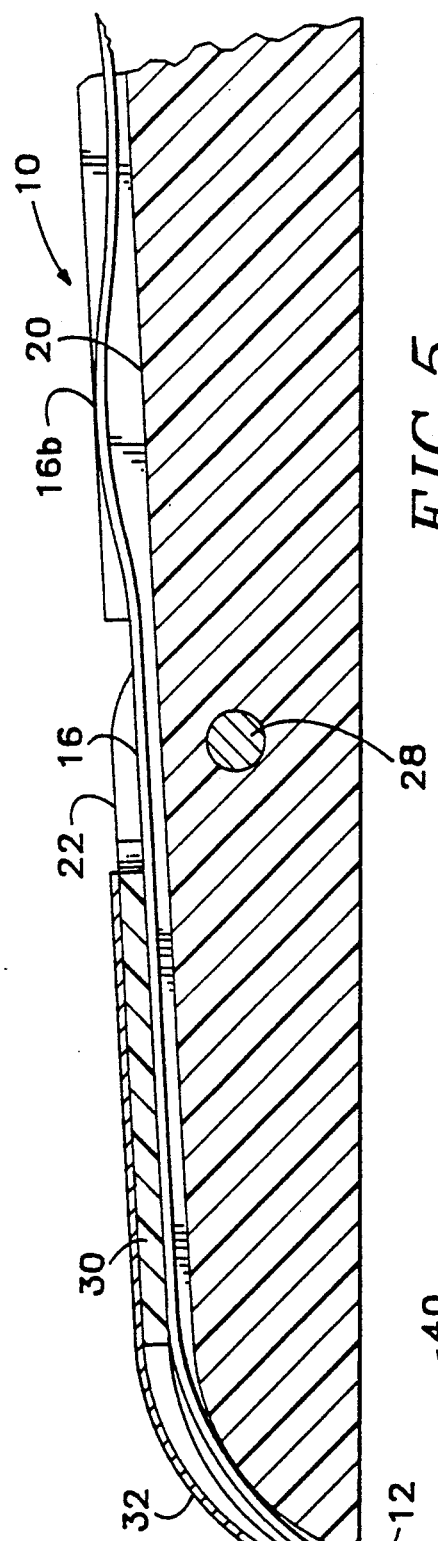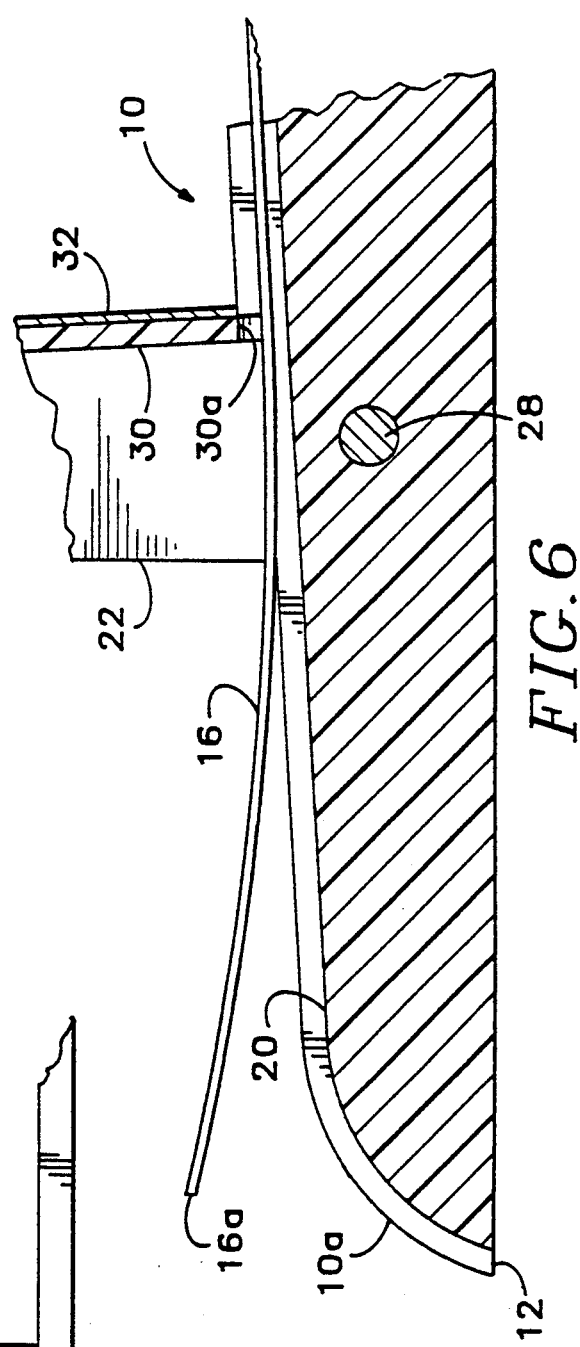

FIBER OPTIC WAFER PROBE

BACKGROUND OF THE INVENTION

The present invention relates to fiber optic probes for use in making on-wafer measurements of the parameters of photodetectors and other optoelectronic test devices.

A previous fiber optic probe for use in making such measurements is shown in Modolo et al., "Wafer Level High-Frequency Measurements of Photodetector Characteristics," *Applied Optics*, volume 27, pages 3059-3061 (1988). In that probe, an optical fiber is pressure fitted into the grooved periphery of a disc segment mounted on a probe arm so that the fiber extends longitudinally through a bend of 90° around the disc segment and thence to a pulsed optical signal source. To probe a given device, the probing end of the optical fiber is advanced longitudinally toward the surface of the test device until it is approximately 100 micrometers from the surface of the device.

A problem in the use of such a probe arises from the fact that the optical fiber is pressure fitted into the peripheral groove of the disc segment and therefore cannot move longitudinally relative to the disc segment. Thus, as the probing end of the optical fiber is moved longitudinally toward the surface of the test device, any slight overtravel in such movement will cause the end of the fiber to impact against the surface causing possible damage either to the surface or to the fiber end, or both.

Another problem arises from the need to provide the optical fiber in a form that is both easily replaceable and of sufficient length to minimize undesirable multimode light transmission effects that cause nonuniform light distribution at the probing end of the fiber.

SUMMARY OF THE INVENTION

The present invention is a fiber optic probe, for use in conducting measurements of on-wafer photodetectors and other optoelectronic test devices, which overcomes the foregoing problems of the prior art.

The danger of possible damage to the fiber and/or the surface of the test device by longitudinal overtravel of the optical fiber as it approaches the test device is substantially eliminated by providing a probe body which loosely guides the optical fiber so as to permit longitudinal movement of a substantial length of the fiber relative to the probe tip and probe body. Thus, if the probing end of the optical fiber is inadvertently forced longitudinally against the surface of the test device, the fiber can buckle longitudinally into a series of shallow bends along the probe body so as to prevent excessive contact force between the probing end of the fiber and the surface of the test device, thereby preventing damage to both.

Easy field replaceability of the optical fiber is provided by a detachable fiber connector at the end of the probe body opposite the probe tip. The probe body is elongate so as to provide a sufficient distance between the detachable connector and the probe tip to enable the use of a replaceable optical fiber long enough to minimize undesirable multimode effects. Preferably, such distance is substantially at least four inches in order to effectively eliminate the multimode effects. Also preferably, the optical fiber is guided by the probe body through a bend in the region adjacent the probe tip to aid in the elimination of the undesirable multimode effects.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a side view of an exemplary embodiment of the fiber optic probe of the present invention.

FIG. 2 is a partial top view of the probe taken along line 2—2 of FIG. 1.

FIG. 3 is an end view taken along line 3—3 of FIG. 1.

FIG. 4 is a perspective view of the tip portion of the probe of FIG. 1.

FIG. 5 is an enlarged longitudinal sectional view of the probe taken along line 5—5 of FIG. 2.

FIG. 6 is a longitudinal sectional view similar to that of FIG. 5 showing installation of the optical fiber.

DESCRIPTION OF THE PREFERRED EMBODIMENT

The preferred embodiment of the fiber optic probe of the present invention comprises a probe body, indicated generally as 10 in FIG. 1, of elongate shape having a probe tip 12 at one end and a conventional optical fiber connector 14 at the other end. The optical fiber connector 14 has a threaded member 14a to which an optical fiber from a light signal source (not shown) can be connected, and has another threaded member 14b to which a replaceable optical fiber 16 is detachably connected by means of a conventional threaded fastener 18.

Along the top of the probe body 10 an open-topped rectangular channel 20 runs longitudinally, curving downwardly immediately before reaching the tip 12 of the probe body. The width and depth of the channel 20 are significantly greater than the diameter of the optical fiber 16, such that the fiber is guided loosely by the channel toward the probe tip 12, emerging therefrom with a downwardly-extending portion terminating in a probing end 16a of the fiber 16. The fiber 16 bends downwardly to follow the downwardly-curved portion of the channel adjacent the probe tip 12 under the urging of a channel cover 22. The cover 22 has a pair of sides 24, 26 (FIG. 4) which are hingedly pivoted to a narrowed portion 10a of the probe body 10 by a pin 28. The tops of the two sides 24 and 26 are connected together by a structural crosspiece 30 (FIGS. 5 and 6) atop which is a thinner hood member 32 which extends forwardly and downwardly from the crosspiece 10 toward the probe tip 12. At the tip 12, the hood member 32 has a centrally located, slight V-shaped depression 34 which loosely centers the optical fiber 16 in the center of the channel 20. Thus, when the hinged cover 22 is in its downwardly-pivoted, closed position, it covers the open top of the portion of the channel 20 adjacent to the tip 12, thereby cooperating with the channel to surround the optical fiber 16 and thereby loosely guide it in a downwardly bent fashion through the downwardly curved portion of the channel 20, centering it in the channel where it emerges from the tip 12. The thinness of the hood member 32 in the area of the probe tip 12 facilitates visibility of the probing end 16a of the optical fiber 16 through a downwardly-directed microscope (not shown) situated above the probe body so that the fiber end's downward approach toward the on-wafer test device 40 (FIG. 5) can be viewed and regulated by the operator. The hinged cover 22 is releasably held in its downwardly-pivoted, closed position by means of an Allen screw 36 threaded through the sidewall 26 so as to releasably abut the narrowed portion 10a of the probe body 10.

The loose guidance of the optical fiber 16 by the combination of the channel 20 and hinged cover 22 holds the optical fiber in proper position on the probe body 10 while nevertheless permitting the fiber 16 to move longitudinally with respect to the tip 12 and, throughout a significant portion of the fiber's length, with respect to the probe body 10. The benefit of this feature is illustrated in FIG. 5 where the end 16a of the optical fiber 16 has been forcibly abutted aqainst the upper surface of the test device 40 by downward overtravel of the probe as it approaches the test device. Rather than damaging the surface of the test device 40 or the end 16a of the fiber 16, such overtravel does not result in excessive contact force but rather causes the fiber 16 to retract longitudinally with respect to the probe body 10 and buckle longitudinally by bending in a shallow manner as illustrated at 16b in FIG. 5. Thus, the loose guidance of the fiber 16 permits its own inherent flexibility to provide a yieldable reaction to downward overtravel and thereby prevent the aforementioned damage.

When it is ultimately necessary to replace the fiber 16 due to wear and tear from repeated use, or to change the fiber type, the hinged cover 22 is pivoted upwardly after loosening of the Allen screw 36, and the optical fiber connector 14 is detached from the probe body so that the threaded connector 18 can be removed and replaced with a new fiber 16 and connector 18. The fiber 16 is easily threaded down the channel 20, passing beneath the edges of the cross member 30 and hood member 32 which are in their upwardly-pivoted positions as shown in FIG. 6. A depression 30a in the edge of the cross member 30 may be provided to maximize the clearance for threading the fiber 16 down the channel 20 with the cover 22 open. Thereafter, the cover 22 is pivoted downwardly to its closed position and the Allen screw 36 retightened.

The significant length of the probe body 10 between its tip 12 and the connector 14 is important in enabling an easily replaceable optical fiber 16 to be provided in a manner consistent with the elimination of undesirable multimode light transmission effects which otherwise cause nonuniform light distribution at the probing end 16a of the fiber 16. A length of substantially at least four inches between the tip 12 and connector 14, enabling the use of a replaceable optical fiber 16 of comparable length, is preferred for this purpose. The downward bending of the fiber 16 adjacent the probe tip 12 also contributes to the elimination of the undesirable multimode effects, but would not by itself be sufficient to eliminate them in the absence of the significant length of the probe body 10 and replaceable fiber 16.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fiber optic probe comprising:
   (a) a probe body having a tip for selectively approaching an optoelectronic test device;
   (b) an elongate optical fiber extending longitudinally along said body and protruding from said tip;
   (c) said body including means for loosely guiding said optical fiber toward said tip and loosely holding said optical fiber in position at said tip so that an elongate portion of said optical fiber is movable longitudinally with respect to said tip and said probe body.

2. The probe of claim 1 wherein said probe body includes means defining an elongate channel extending along said body toward said tip for loosely guiding said optical fiber.

3. The probe of claim 2 wherein said channel partially surrounds said optical fiber, further including cover means selectively movable with respect to said probe body for cooperating with said channel to completely surround an elongate portion of said optical fiber loosely.

4. The probe of claim 3 wherein said cover means is movably connected to said probe body.

5. The probe of claim 3 wherein said cover means is adjacent to said tip when cooperating with said channel to completely surround said elongate portion of said optical fiber.

6. The probe of claim 3 wherein said cover means cooperates with said channel to loosely guide said optical fiber so as to form an elongate bend in said fiber.

7. The probe of claim 1 wherein said probe body includes means for loosely guiding said optical fiber so as to form an elongate bend in said fiber while enabling said fiber to move longitudinally with respect to said probe body through said bend.

8. The probe of claim 1 wherein said probe body is of elongate shape having a pair of ends, said tip being adjacent one end thereof and a connector for detachably connecting said optical fiber to said probe body being mounted on said probe body adjacent the other end thereof.

9. The probe of claim 8 wherein the length of said probe body extending between said connector and said tip is substantially at least four inches.

10. A fiber optic probe comprising:
    (a) a probe body having a tip for selectively approaching an optoelectronic test device;
    (b) an elongate optical fiber extending longitudinally along said body and protruding from said tip;
    (c) said probe body being of elongate shape and having a pair of ends, said tip being adjacent one end thereof and a connector for detachably connecting said optical fiber to said probe body being mounted on said probe body adjacent the other end thereof.

11. The probe of claim 10 wherein the length of said probe body extending between said connector and said tip is substantially at least four inches.

12. The probe of claim 10 wherein said probe body includes means for guiding said optical fiber so as to form an elongate bend in said fiber.

13. A fiber optic probe comprising:
    (a) a probe body having a tip for selectively approaching an optoelectronic test device;
    (b) an elongate optical fiber extending longitudinally along said body and protruding from said tip;
    (c) means on said probe body defining an elongate channel extending along said body toward said tip for guiding said optical fiber, said channel partially surrounding said optical fiber; and (d) cover means selectively movable with respect to said probe body for cooperating with said channel to completely surround an elongate portion of said optical fiber.

14. The probe of claim 13 wherein said cover means is movably connected to said probe body.

15. The probe of claim 13 wherein said cover means is pivotally connected to said probe body.

16. The probe of claim 13 wherein said cover means is adjacent to said tip when cooperating with said channel to completely surround said elongate portion of said optical fiber.

17. The probe of claim 13 wherein said cover means cooperates with said channel to guide said optical fiber so as to form an elongate bend in said fiber.

* * * * *